Dec. 1, 1964   R. R. BOLLMAN   3,158,920
AUTOMATICALLY INDEXED TOOL TURRET
Filed Jan. 16, 1963   3 Sheets-Sheet 1

INVENTOR.
RALPH R. BOLLMAN

BY
*Howard Keiser*
*& Jack J. Earl*
ATTORNEYS

United States Patent Office 3,158,920
Patented Dec. 1, 1964

3,158,920
AUTOMATICALLY INDEXED TOOL TURRET
Ralph R. Bellman, Cincinnati, Ohio, assignor to The Cincinnati Milling Machine Co., Cincinnati, Ohio, a corporation of Ohio
Filed Jan. 16, 1963, Ser. No. 251,880
7 Claims. (Cl. 29—35.5)

The present invention relates to an automatically indexable tool turret of the type which is particularly adapted to hold a plurality of lathe tools and which is rotatable station to station to present the tools one at a time and in sequence for use in a metal cutting operation.

An object of this invention is to provide a compact automatically indexable tool turret.

Another object of this invention is to provide a single action mechanism to both unclamp and reclamp a tool turret as well as to rotate the turret in predetermined angular steps.

A further object of this invention is to provide a tool turret which has a powered indexing mechanism that is operated simply and efficiently and which can be combined with a positive stopping mechanism without requiring a complicated and interrelated control system to allow indexing.

A further object is to provide a tool turret which may be oriented to index around an axis extending in any direction.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form of this invention, a mechanism is provided which operates to release, index and reclamp an axle on which a tool holder is fixed by a single reciprocal stroke of a motor. In addition, a mechanism is also included which fixedly locates the turret in a predetermined angular position each time the turret is indexed without requiring further motor means or interconnection by means of an electrical or hydraulic control system. A clear understanding of the construction and operation of the turret can be obtained from the following detailed description in which reference is made to the attached drawings wherein:

Figure 3:
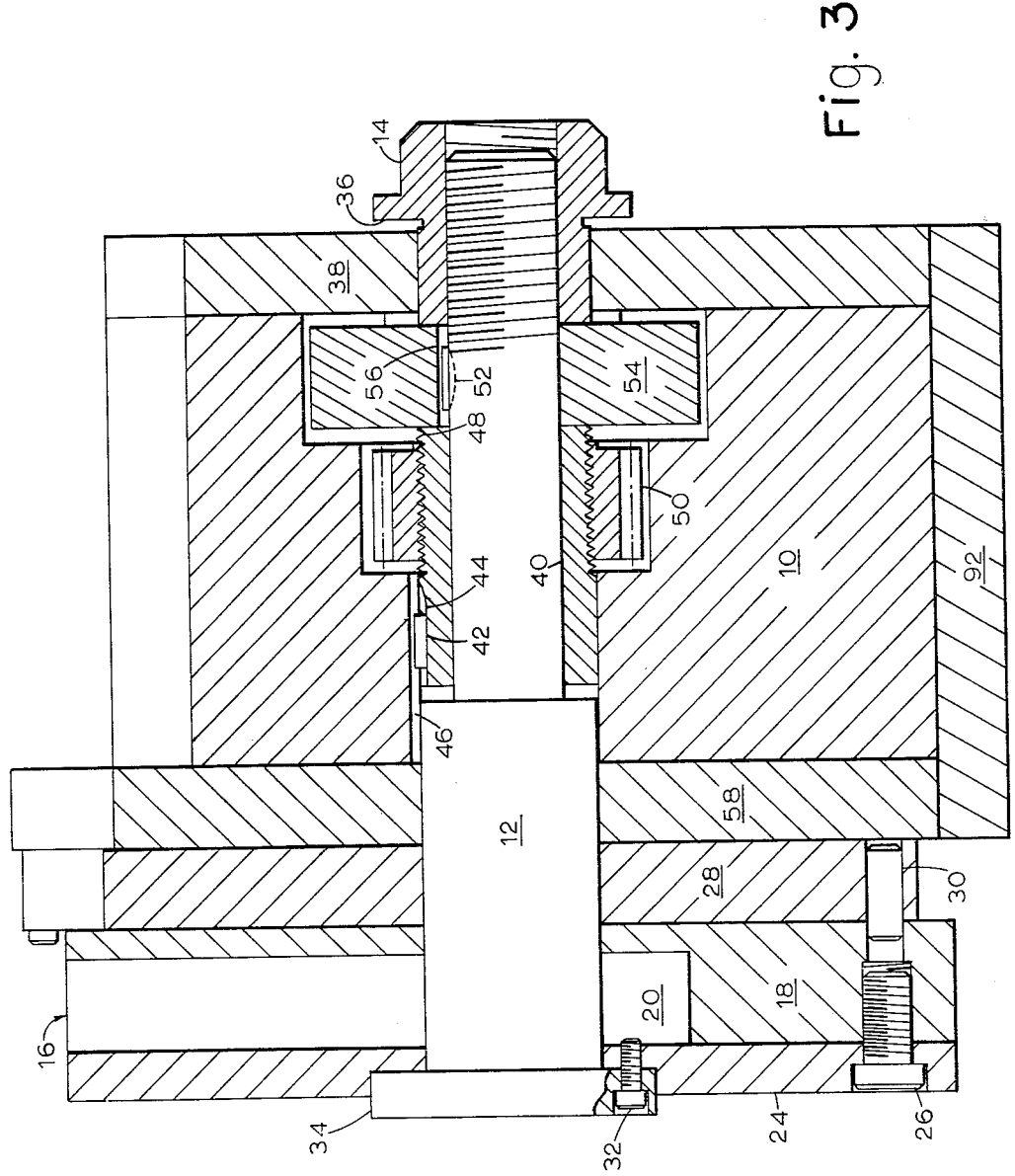
FIG. 3 is a section view of the turret of FIGS. 1 and 2 taken on line 3—3.

As shown in FIG. 3, the turret is built around a housing 10 through which a rotatable axle 12 is journaled. A nut 14 is threadedly engaged on one end of the axle 12 and a tool holder 16 is fixed to the other end of the axle 12. The tool holder 16 is made up of a member 18 in which tool receiving recesses 20 are formed, a cover plate 24 fixed to the member 18 by machine screws 26, and a stop plate 28 that is fixed to the other side of the member 18 by pins 30. The axle 12 is secured to the cover plate 24 by machine screws 32 which extend through the head 34 formed on the end of the axle 12. As shown in FIG. 3, the nut 14 is not turned onto the axle 12 to such an extent as to prevent axial movement of the axle 12 but provides for a limited amount of movement equal to the space between a shoulder 36 on the nut 14 and the outer surface of a cover plate 38 which is fixed to the housing 10 (by screws not shown).

A bushing 40 is received over the axle 12 in the body 10 and is free to move a limited distance parallel to the axle 12 in the body 10. A key 42 is received between a slot 44 in the bushing 40 and a slot 46 in the housing 10 to prevent the bushing 40 from rotating, however. The bushing 40 has a threaded external surface 48 on which a pinion 50 having a threaded bore is engaged. A ratchet wheel 54 is received on the axle 12 between the bushing 40 and the nut 14. A key 52 extends from the axle 12 into a slot 56 in the ratchet wheel 54 to render the axle 12 and ratchet wheel 54 rotatable together. It can be seen from FIG. 3 that as the pinion 50 is rotated the bushing 40 will shift in the housing 10. When the pinion 50 is rotated in one direction it shifts leftward against the housing 10 and the bushing 40 will move toward the right and cause the ratchet wheel 54 to bear against the nut 14 and push the axle 12 rightward until the stop plate 28 bears firmly against a bracket plate 58 which is fixed to the housing 10. By forceful rotation of the pinion 50 the pressure between the stop plate 28 and the bracket plate 58 will act to restrain the axle 12 from rotation and further axial movement, in effect clamping the axle 12 in the housing 10. Rotation of the pinion 50 in the other direction will result in the bushing 40 moving leftward to relieve the pressure between the stop and bracket plates 28, 58 to release the axle 12 for angular movement to index the tool holder 16.

Figure 1:
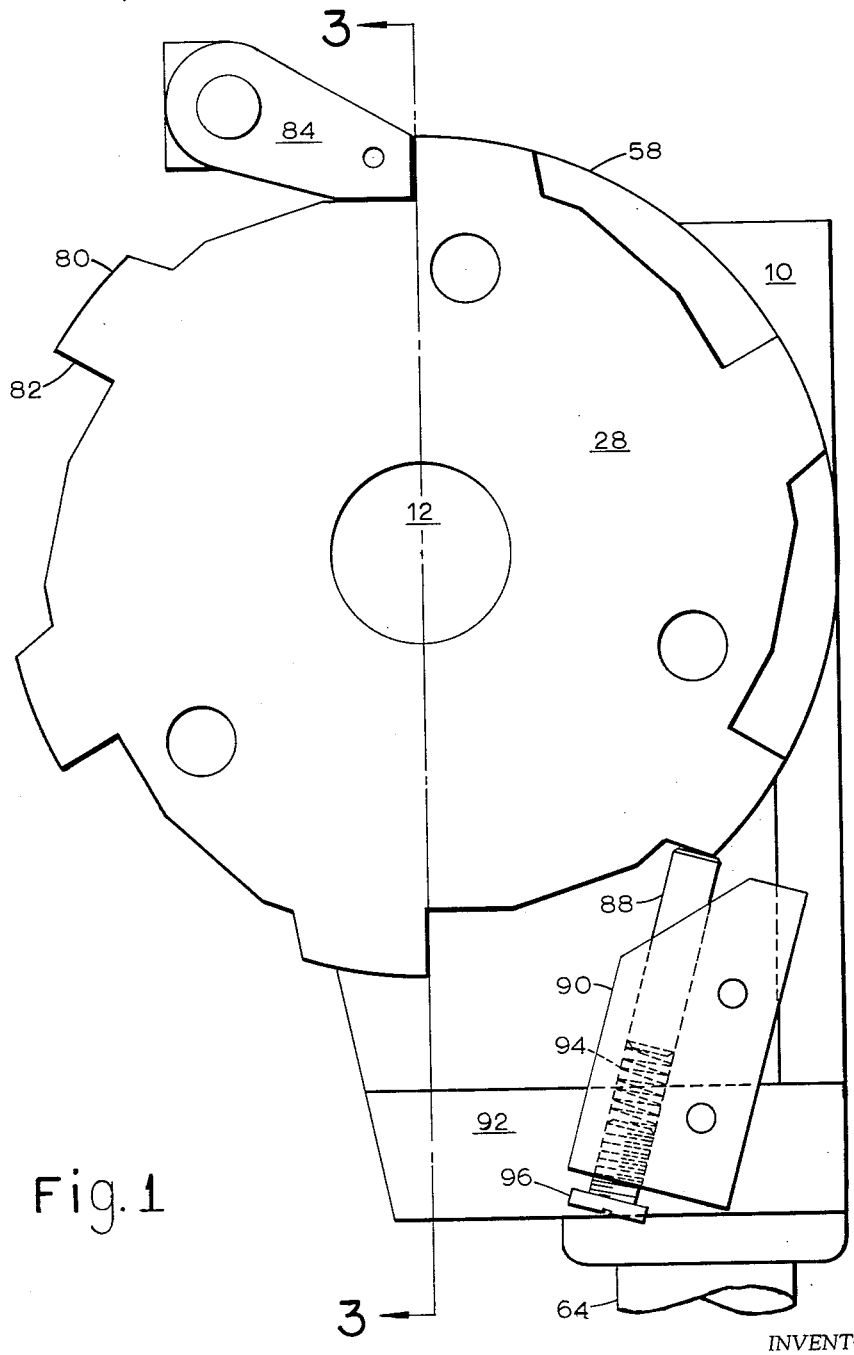
FIG. 1 is a view of the turret mechanism from one end with the tool holder removed to expose the positive stop mechanism.
Figure 2:
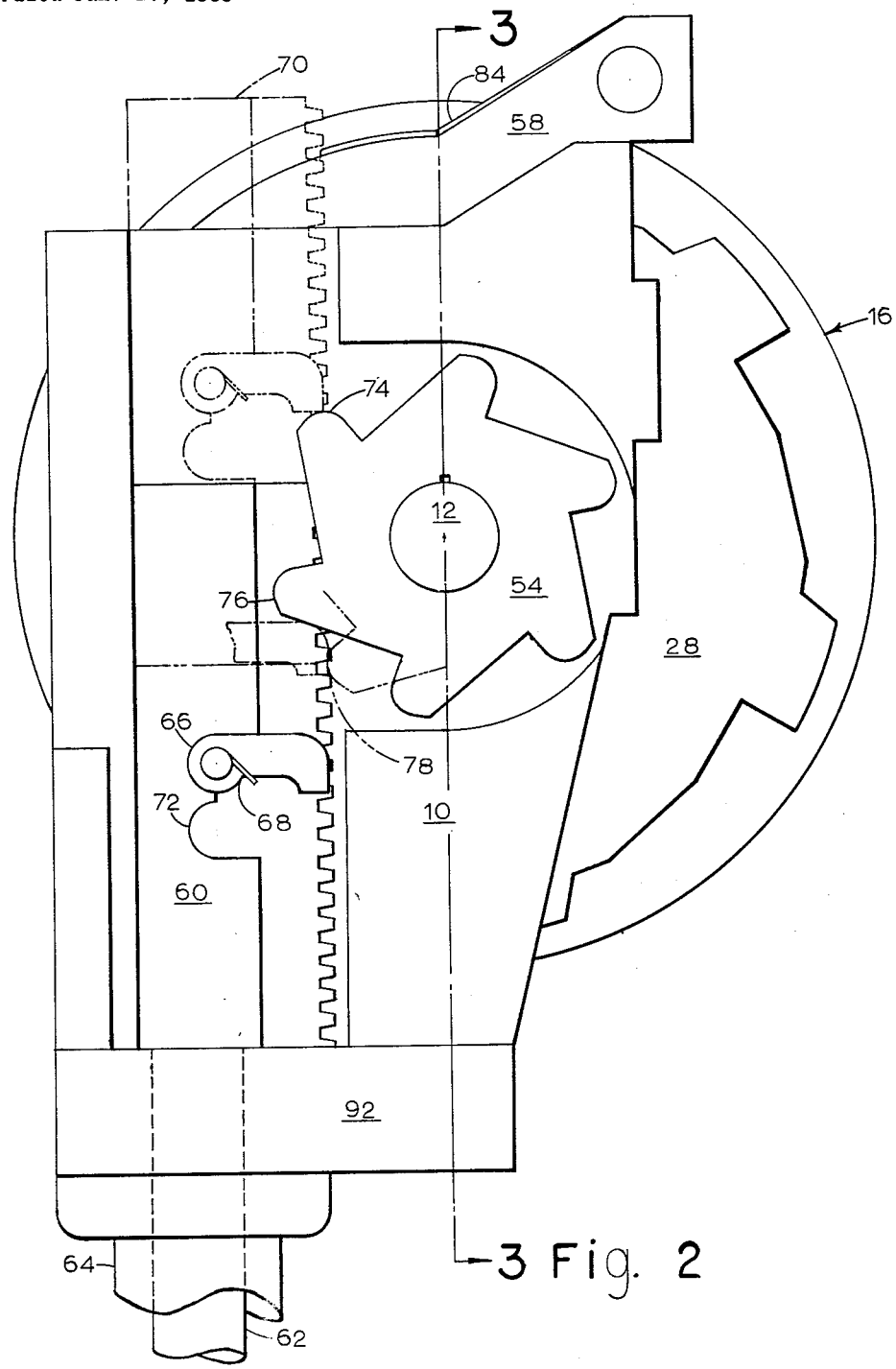
FIG. 2 is an end view of the turret mechanism from the other end with a cover plate removed to expose the indexing drive.

The mechanism by which the pinion 50 is rotated is shown in FIG. 2. A rack member 60 is received in the housing 10 and is drivingly engaged with the pinion 50 for rotation thereof when the rack 60 is longitudinally moved. The rack 60 is fixed on the end of a piston rod 62 which extends from a fluid motor 64 that is operable to produce a reciprocal stroke of the piston rod 62 and rack 60 in a well known manner. Thus the pinion 50 can be rotated in one and the other directions by operation of the motor 64. A shift of the piston rod 62 upward to move the rack 60 away from the motor 64 will result in a shift of the bushing 40 leftward, as viewed in FIG. 3, to release the axle 12 for free rotation. A pawl 66 is swingably fixed to the rack 60 but biased by a spring 68 to extend therefrom as shown. The upward movement of the rack 60 to the position 70 will cause the pawl 66 to swing downward relative to the rack 60 and into the notch 72 until the pawl 66 clears the drive lobes 74, 76 and is allowed to extend, assuming a restraint on the axle 12 preventing it from rotating clockwise as viewed in FIG. 1. Such a restraint will be described subsequently herein. After the motor 64 has moved the rack 60 to the position 70, the pawl 66 is allowed to extend over the lobe 74 for driving engagement therewith. The motor 64 is then reversed and the rack 60 is pulled downward to rotate the ratchet wheel 54 and axle 12 in the counter-clockwise direction. When the lobe 74 has rotated to the position 78, the pawl 66 is allowed to pass the lobe 74 and the rack 66 continues movement to the position shown. It is during this last portion of movement of the rack 60 in which the bushing 40 is shifted to the point that the tool holder 16 is clamped against movement by the pressure between the stop plate 28 and bracket plate 58, the tool holder having been unclamped during the initial portion of the upward stroke of the rack 60. Thus when the piston and cylinder motor 64 is operated through a reciprocal stroke, the tool holder 16 is first unclamped, then rotated through an angular increment, and then reclamped.

The stop plate 28, shown best in FIG. 1, has a plurality of lugs 80 spaced therearound and each of these has a stop surface 82 which is adapted to engage a stop pawl 84. The stop pawl 84 is pivotally attached to the bracket plate 58 above the stop plate 28 and drags along the stop plate 28 as it is indexed with the tool holder 16 for which it forms one side. As viewed in FIG. 1, the axle 12 and stop plate 28 are rotated clockwise by the downward stroke of the rack 60 and the lugs 80 will pass the stop pawl 84 without interference. The stop pawl 84 will prevent the reverse rotation of the stop plate 28 and axle 12, however, as soon as a stop surface 82 engages the stop pawl 84. Thus the axle 12 will rotate past the lugs 80 in one direction only. A plunger 88 is slidably received in a block 90 which is fixed to the bracket plate 58 and a base plate 92 that is fixed below the housing 10. The plunger 88 is urged upward by a spring 94 received in the block 90 between the plunger 88 and an adjusting screw 96. The plunger 88 depresses into the block 90 as the stop plate 28 is rotated clockwise, as viewed in FIG. 1, and the lugs 80 will ride over the plunger if the index plate continues to rotate more than a predetermined amount. The plunger is so arranged that during one downward stroke of the rack 60, one lug will pass the plunger 88 and a second one will engage and depress it but will not ride over it. At that point, the ratchet pawl 66 will pass off of the ratchet wheel 54 and the plunger 88 will operate to force the stop plate 28 back around counter-clockwise, FIG. 1, until the stop pawl 84 engages a stop surface 82 on one of the lugs 80. This happens immediately after the ratchet pawl 66 is drawn away from the ratchet wheel 54 and before the final movement of the bushing 40 results in the clamping of the mechanism. In this manner, each reciprocal stroke of the rack 60 will produce an index movement of the axle 12 to which the tool holder 16 is attached.

Since the ratchet wheel 54 has six lobes 74 and the stop plate 28 has six lugs 80, and each stroke of the rack 60 will move one lug 80 past the plunger 88, the mechanism in the embodiment shown will index in six equal steps to move the axle through a complete revolution and six predetermined angular positions of the tool holder 16 are available to present tools to a workpiece. The number of angular positions, however, can be changed without changing the theory and principle of operation of the mechanism. The mechanism is uncomplicated and is operated by a single piston and cylinder motor 64 which acts to perform the multiple functions described quickly and effectively. The stop plate 28 and plunger 88 combine in the mechanism to give the positive location in each of the predetermined positions to which the tool holder 16 can be indexed. In addition, the stop plate 28 and pawl 84 provide additional rigidly to supplement the clamping forces supplied by the shifting of the bushing 40 during a cutting operation since the reactive forces on a cutting tool (not shown) in the tool holder 16 can be directed to tend to rotate the lugs 80 against the stop pawl 84.

What is claimed is:
1. An automatically indexable tool turret comprising:
   (a) a housing,
   (b) an axle journalled through said housing for rotation therein and for limited axial movement therethrough,
   (c) a tool holder fixed on one end of said axle and defining the limit of axial movement of said axle in one direction when said tool holder is received firmly against said housing, said axle thereby restrained from movement,
   (d) means releasably to apply a force to shift said axle in said one direction to engage said tool holder firmly against said housing,
   (e) a power mechanism operable through a reciprocal stroke to operate said clamp means to release and apply said axle shifting force, and
   (f) a ratchet mechanism responsive to stroking of said power mechanism to rotate said axle a predetermined amount during the period of operation thereof when said tool holder is not firmly engaged against said housing.

2. An automatically indexable tool turret comprising:
   (a) a housing,
   (b) an axle journalled through said housing for rotation therein and for limited axial movement therethrough,
   (c) a tool holder fixed on one end of said axle and defining the limit of axial movement of said axle in one direction when said tool holder is received firmly against said housing, said axle thereby restrained from movement,
   (d) a clamp member received around said axle for movement relative to said housing parallel to said axle, said clamp member adapted to carry said axle in said one direction to engage said tool holder against said housing,
   (e) a driving member movable through a reciprocal stroke to shift said clamp member one way and the other, and
   (f) a ratchet mechanism responsive to movement of said driving member to rotate said axle a predetermined amount during the period of operation when said tool holder is not firmly engaged against said housing.

3. An automatically indexable tool turret comprising:
   (a) a housing,
   (b) an axle journalled through said housing for rotation therein and for limited axial movement therethrough,
   (c) a tool holder fixed on one end of said axle and defining the limit of axial movement of said axle in one direction when said tool holder is received firmly against said housing, said axle thereby restrained from movement,
   (d) a ratchet wheel received over said axle and rotatable therewith,
   (e) a clamp member having an externally threaded surface received around said axle for movement relative to said housing parallel to said axle, said clamp member adapted to carry said axle in said one direction to engage said tool holder against said housing,
   (f) a pinion having an internally threaded bore engaged with said threaded external surface,
   (g) a rack engaged with said pinion and reciprocally movable in said housing,
   (h) a pawl swingably fixed to said rack and engaged with said ratchet wheel, and
   (i) means to shift said rack one way and the other, said clamp member shifted to allow said axle to move and carry said tool holder away from said housing when said rack moves one way and shifted to move said axle to carry said tool holder into contact with said housing when said rack moves the other way, said pawl rotating said ratchet wheel a predetermined amount when said rack moves said other way before said tool holder engages said housing.

4. An automatically indexable tool turret comprising:
   (a) a housing,
   (b) an axle journaled through said housing for rotation therein and for limited axial movement therethrough,
   (c) a tool holder fixed on one end of said axle and defining the limit of axial movement of said axle in one direction when said tool holder is received firmly against said housing, said axle thereby restrained from movement,
   (d) means releasably to apply a force to shift said axle in said one direction to engage said tool holder firmly against said housing,
   (e) a power mechanism operable through a reciprocal stroke to operate said clamp means to release and apply said axle shifting force,
   (f) means to hold said tool holder positively against rotation in the other direction in each of a series of predetermined angular positions, and (g) a ratchet mechanism responsive to stroking of said power mechanism to rotate said axle in one direction during the period of operation thereof when said tool holder is not firmly engaged against said housing to shift said tool holder from one predetermined angular position thereof to another.

5. An automatically indexable tool turret comprising:
(a) a housing,
(b) an axle journalled through said housing for rotation therein and for limited axial movement therethrough,
(c) a tool holder fixed on one end of said axle and defining the limit of axial movement of said axle in one direction when said tool holder is received firmly against said housing, said axle thereby restrained from rotation,
(d) means releasably to apply a force to shift said axle in said one direction to engage said tool holder firmly against said housing,
(e) a power mechanism operable through a reciprocal stroke to operate said clamp means to release and apply said axle shifting force,
(f) a stop plate fixed to said tool holder and having a series of stop surfaces angularly spaced therearound,
(g) a positive stop pawl pivotally attached to said housing and adapted to engage each of said stop surfaces and to hold said tool holder against rotation in the other direction when said tool holder is in each of a series of predetermined angular positions, and
(h) a ratchet mechanism responsive to stroking of said power mechanism to rotate said axle and tool holder in one direction during the period when said tool holder is not firmly engaged against said housing to shift said tool holder from one predetermined angular position thereof to another.

6. An automatically indexable tool turret comprising:
(a) a housing,
(b) an axle journalled through said housing for rotation therein and for limited axial movement therethrough,
(c) a tool holder fixed on one end of said axle and defining the limit of axial movement of said axle in one direction when said tool holder is received firmly against said housing, said axle thereby restrained from rotation,
(d) a clamp member received in said housing around said axle for movement relative to said housing parallel to said axle, said clamp member adapted to carry said axle in one direction to engage said tool holder against said housing,
(e) a driving member movable through a reciprocal stroke to shift said clamp member one way and the other,
(f) a stop plate fixed to said tool holder and having a series of stop surfaces angularly spaced therearound,
(g) a positive stop pawl pivotally attached to said housing and adapted to engage each of said stop surfaces and to hold said tool holder against rotation in the other direction when said tool holder is in each of a series of predetermined angular positions,
(h) means tending to rotate said tool holder in said other direction when said tool holder is in each of said predetermined angular positions to hold said stop pawl and stop surfaces in intimate contact, and
(i) a ratchet mechanism responsive to stroking of said power mechanism to rotate said axle and tool holder in one direction during the period when said tool holder is not firmly engaged against said housing to shift said tool holder from one predetermined angular position thereof to another.

7. An automatically indexable tool turret comprising:
(a) a housing,
(b) an axle journalled through said housing for rotation therein and for limited axial movement therethrough,
(c) a tool holder fixed on one end of said axle and defining the limit of axial movement of said axle in one direction when said tool holder is received firmly against said housing, said axle thereby restrained from movement,
(d) a ratchet wheel received over said axle and rotatable therewith,
(e) a clamp member having an externally threaded surface received around said axle for movement relative to said housing parallel to said axle, said clamp member adapted to carry said axle in said one direction to engage said tool holder against said housing,
(f) a pinion having an internally threaded bore engaged with said threaded external surface,
(g) a rack engaged with said pinion and reciprocally movable in said housing,
(h) a pawl swingably fixed to said rack and engaged with said ratchet wheel,
(i) means to shift said rack one way and the other, said clamp member shifted to allow said axle to move and carry said tool holder away from said housing when said rack is moved one way and shifted to move said axle to carry said tool holder into contact with said housing when said rack is moved the other way, said pawl rotating said ratchet wheel when said rack is moved said other way before said tool holder is engaged with said housing,
(j) a stop plate fixed to said tool holder and having a series of stop surfaces angularly spaced therearound,
(k) a positive stop pawl pivotally attached to said housing and adapted to engage each of said stop surfaces and to hold said tool holder against rotation in the other direction when said tool holder is in each of a series of predetermined angular positions, said tool holder shifted from one of said predetermined angular positions to another by operation of said ratchet wheel and pawl, and
(l) a plunger adapted to engage said stop plate to tend to rotate said tool holder in said other direction when said tool holder is in each of said predetermined angular positions to hold said stop pawl and stop surfaces in intimate contact while said tool holder is carried into contact with said housing.

References Cited in the file of this patent
UNITED STATES PATENTS
2,968,973    Mead ------------------ Jan. 24, 1961